United States Patent [19]

Tamura et al.

[11] Patent Number: 4,767,461
[45] Date of Patent: Aug. 30, 1988

[54] METHOD FOR MANUFACTURING CONCRETE

[75] Inventors: Kazumi Tamura; Hideo Fujita, both of Hiroshima, Japan

[73] Assignee: Mitsubishi Jukogyo Kabushiki Kaisha, Tokyo, Japan

[21] Appl. No.: 883,536

[22] Filed: Jul. 9, 1986

[30] Foreign Application Priority Data

Aug. 9, 1985 [JP] Japan .................................. 60-174275

[51] Int. Cl.⁴ .............................................. B28C 7/04
[52] U.S. Cl. ........................................ 106/98; 366/2; 366/6; 366/8
[58] Field of Search ...................... 366/2, 6, 8; 106/98

[56] References Cited

U.S. PATENT DOCUMENTS 1,904,025  4/1933  Yohe ......................................... 366/8
4,431,310  2/1984  Ito et al. .................................. 366/8

FOREIGN PATENT DOCUMENTS 937264  9/1963  United Kingdom .................... 366/6

OTHER PUBLICATIONS

The American Society of Mechanical Engineers, "Proceedings of the Sixth (1987) International Offshore Mechanics and Arctic Engineering Symposium", pp. 185-191.

Primary Examiner—Steven Capella
Attorney, Agent, or Firm—Birch, Stewart, Kolasch & Birch

[57] ABSTRACT

The present invention is directed to a method for manufacturing a concrete which comprises the steps of mixing 20 to 100% of the total weight of cement used with water in an amount of 20 to 50% of this cement weight in order to prepare a stiff-consistency cement paste, afterward mixing the thus prepared cement paste with a coarse aggregate, further mixing 80 to 0% of the total amount of the cement and sand therewith in the order of the cement and the sand or at one time, and then mixing therewith the remaining water necessary to harden the total cement; or the present invention is directed to a method for manufacturing a concrete which comprises the steps of mixing 20 to 100% of the total weight of cement used with water in an amount of 20 to 50% of this cement weight and a coarse aggregate, so that a stiff-consistency cement paste is caused to adhere to the coarse aggregate, afterward mixing 80 to 0% of the total weight of cement and sand therewith in the order of the cement and the sand or at one time, and further mixing therewith the remaining water necessary to harden the total cement.

12 Claims, 1 Drawing Sheet

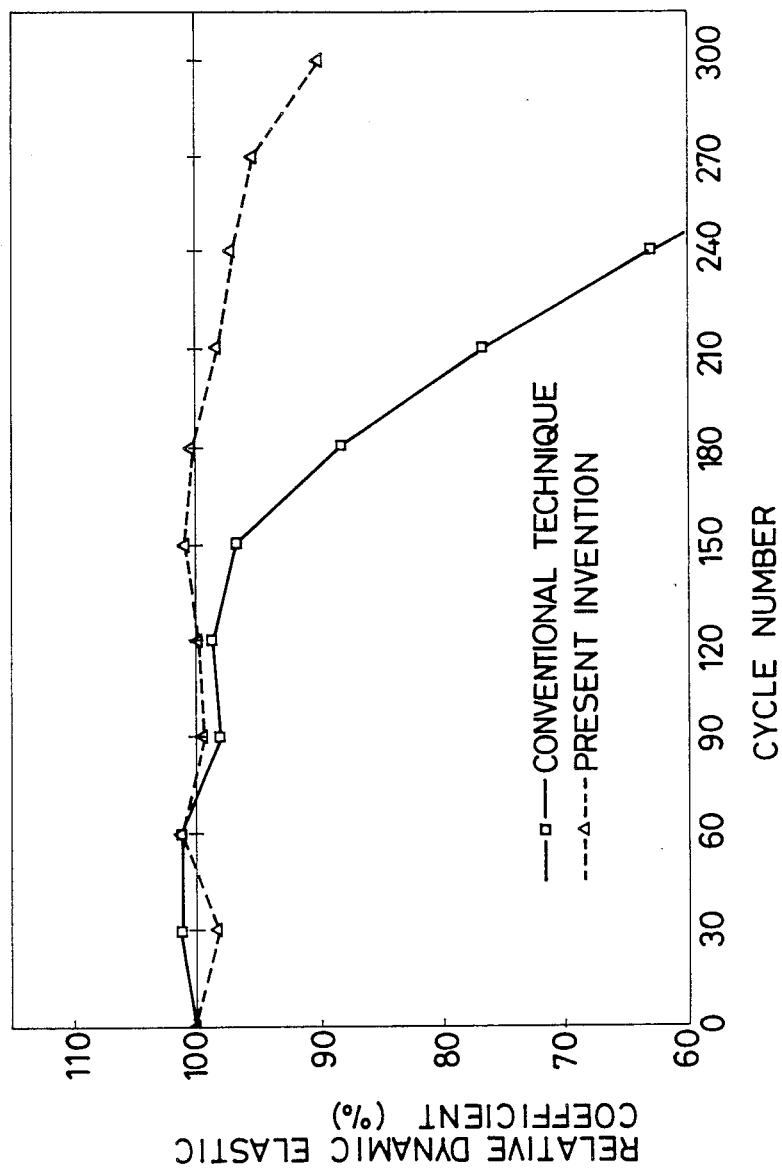
F I G. 1

METHOD FOR MANUFACTURING CONCRETE

BACKGROUND OF THE INVENTION (1) Field of the Invention

The present invention relates to a method for preparing a concrete in which the slump is improved remarkably. The concrete of the present invention is applicable in manufacturing an ordinary concrete or a lightweight concrete which is useful in all concrete structures such as marine concrete structures, buildings, foundations and the like.

(2) Description of the Prior Art

Heretofore, a concrete was usually manufactured by the following method. The method has generally been utilized in a raw concrete factory or elsewhere:

Process (1) In the first place, a cement, water, sand and an admixture material are mixed with one another.

Process (2) Next, a course aggregate (a gravel, a macadam (crushed stone) or a lightweight aggregate for a lightweight concrete) is added and mixed.

The present invention contemplates providing a method for manufacturing a concrete with the aim that the concrete manufactured has improved performance as compared with the performance of an ordinary concrete or a lightweight concrete manufactured by a conventional method.

While the aforementioned improvements in the performance result in a noticeable improvement in the slump of the concrete of the present invention, the strength performance obtained therefor is either equal to or even greater than that of the conventional concrete.

In the case of the lightweight concrete, the lightweight aggregate which is dispersed therein has many voids (the volume of the inner voids occupies 50% of that of the total concrete) and its water absorption is remarkably high, which makes quality control of the concrete very difficult. This high water absorption greatly influences the quality of a fresh lightweight concrete and a hardened lightweight concrete. Of the factors which influences the quality freeze-thaw (freezing and thawing) and pump pressure delivery (transfer) properties are important. In particular, the freeze-thaw property largely varies with a control process of the lightweight aggregate, thereby rendering it difficult to handle such an aggregate. Moreover, with regard to the pump pressure delivery property, it is prohibited by a standard of Japanese Building Society to deliver the lightweight aggregate under pressure by a pump (since the lightweight aggregate is water-absorptive, the pump would be clogged with the aggregate therein, so that the delivery of the concrete would be impossible).

A conventional kneading method of manufacturing the lightweight concrete comprises a first step of uniformly mixing, sand with a cement and adding water thereto to prepare a mortar, and a second step of mixing the mortar with a lightweight aggregate to form the concrete. In this case, however, there is a large amount of free water in the mortar, and upon the addition of the lightweight aggregate thereto, the free water is absorbed thereby resulting in the fluidity of the mortar being described (owing to this phenomenon, the pump pressure delivery of the mortar would be impossible) and the freeze-thaw resistance thereof would also be deteriorated. Alternatively, the lightweight aggregate allowed initially to absorb water to its full capacity, but even in this case, the pressure delivery by the pump can not be accomplished and the freeze-thaw property also becomes poor.

Accordingly, the present invention provides an improved method for preparing a lightweight concrete. According to this method, a kneading process of the lightweight concrete is altered, and in consequence, the above mentioned drawbacks of the conventional technique are solved. That is, the freeze-thaw resistance can be heightened, and the delivery of the lightweight concrete under a pumping pressure can be achieved, as in an ordinary concrete.

SUMMARY OF THE INVENTION

The present invention is connected to (1) a method for manufacturing a concrete which comprises the steps of mixing 20 to 100% of the total weight of cement used with water in an amount of 20 to 50% of this cement weight in order to prepare a stiff-consistency (dry consistency) cement paste, afterward mixing the thus prepared cement paste with a coarse aggregate, further mixing 80 to 0% of the total amount of the cement and sand therewith in the order of the cement and the sand or at one time, and then mixing therewith the remaining water necessary to harden the total cement; and (2) a method for manufacturing a concrete which comprises the steps of mixing 20 to 100% of the total weight of cement used with water in an amount of 20 to 50% of this cement weight and a coarse aggregate, so that a stiff-consistency (dry consistency) cement paste is caused to adhere to the coarse aggregate, afterward mixing 80 to 0% of the total weight of used cement and sand therewith in the order of the cement and the sand or at one time, and further mixing therewith the remaining water necessary to harden the total cement.

Further, a preferable embodiment of the present invention is that in preparing the stiff-consistency cement paste in the preceding paragraphs (1) and (2), 0 to 60% of the total amount of a chemical admixture to be used is prior to the last, and in mixing the remaining water in the last step, the remaining chemical admixture is also mixed therewith. Another preferable embodiment of the present invention is that in mixing 0 to 80% of the total cement and the sand in the preceding paragraphs (1) and (2), an admixture material is mixed.

BRIEF DESCRIPTION OF THE DRAWING

FIG. 1 is a diagram showing data regarding the freeze-thaw resistance of a concrete prepared by the present invention, i.e., a relation between a relative dynamic elastic coefficient and a cycle number which has been obtained in Example 6.

DESCRIPTION OF THE PREFERRED EMBODIMENTS

The novel points of the present invention are as follows:

(1) Materials (a cement, water, sand, a gravel and the like) of a concrete are not mixed at one time but separately.

(2) First, the cement and water are partially mixed to prepared a paste-like material, and the gravel and the like are then directly mixed with the prepared paste-like material.

(3) In order to prepare the cement paste, the water is added separately.

In the present invention, a coarse aggregate defines a coarse aggregate (gravel, macadam and the like) for an ordinary concrete and a lightweight aggregate for a lightweight concrete.

Examples of the lightweight aggregates include natural lightweight aggregates such as lapilli, pumice and volcanic ash; by-product lightweight aggregates such as expanded slug and coal cinders; and artificial aggregates such as shale, clay and slate.

In the present invention, when a stiff-consistency cement paste is prepared, 20 to 100% of the total cement amount is uniformly mixed with water in an amount of 20 to 50 wt% of this cement weight, and the reason for this is as follows:

A feature of the present invention is that membranes of the cement paste are formed around the grains of the coarse aggregate, but 20% or less of the total cement amount is insufficient to uniformly form such membranes, because the amount of membranes of the cement paste available is insufficient. Further, when the stiff-consistency cement paste is manufactured, the total amount of the cement can previously be mixed without any problem. However, when the amount of the cement is too large, a bleeding phenomenon (in which a floating water in the concrete increases) will at times occur, and consequently, the upper limit of the water content is set at approximately 50%.

When the amount of water is too small, a paste state will not be obtained, and thus the cement paste cannot be caused to adhere around the grains of the coarse aggregate. Inversely when the amount of water is too large, the cement paste will be watery, and thus the stiff-consistency cement paste will not be obtained. In consequence, the cement paste cannot be caused to adhere around the grains of the coarse aggregate, and further, the improvement in concrete strength cannot be achieved. Therefore, it is important that the amount of water is within the range of 20 to 50 wt% based on the weight of the cement.

In preparing the above mentioned stiff-consistency cement paste, a chemical admixture may be mixed in an amount of 0 to 60 wt% based on the total chemical admixture weight (the chemical admixture is an agent the volume of which is not counted in the volume of the concrete or the like, and usual examples of the chemical admixtures include an AE agent (air entraining agent) for entraining fine air bubbles into the concrete and a water reducing agent for strongly dispersing the cement grains in order to provide a water reducing effect, but in the present invention, the latter is meant by the chemical admixture). When the chemical admixture is mixed, a unit water amount can be reduced by 10 to 20% or so, as compared with the concrete containing no chemical admixture (under the condition that its softness is the same).

As the chemical admixture, there can be used Mighty 150 (trade name; Kao Soap Co., Ltd.; sodium salt of β-naphthalenesulfonic acid formalin condensation product), NL-4000 (trade name; Nippon Soda Master Builders Co., Ltc.; highly condensed triazine compound) and the like.

The reason why the chemical admixture to be mixed is used in an amount of 0 to 60% based on its total weight is as follows:

If it is contemplated to increase a fluidity of the produced concrete (to soften the concrete), the total amount of the chemical admixture should not be added (i.e., 0%) in manufacturing the cement paste, but the amount not having been previously added, is added at the last step. This procedure is more effective (which is called the effect by a "post-addition" of the chemical admixture). However, in the case of the post-addition, the above mentioned bleeding phenomenon is more liable to appear, so that an excellent concrete cannot be manufactured. If 60% or more of the chemical admixture is added at an initial step, the effect of the post-addition by the chemical admixture will be lowered, with the result that the addition of its residue at a late stage have no effect. For this reason, in the present invention, 0 to 60% of the chemical admixture is added in the time the stiff-consistency cement paste is prepared. Further, if the amount of the chemical admixture to be added is within the preferable range of 25 to 50% or so, the cement will readily disperse, and an improved concrete having no bleeding phenomenon can be obtained.

In the present invention, after the stiff-consistency cement paste has been prepared, the coarse aggregate may be mixed with the prepared cement paste, to adhere the paste around the grains of the aggregate, or alternatively the coarse aggregate may be initially mixed with the other materials in preparing the paste so that the paste can adhere around the grains of the aggregate simultaneously with the preparation of the paste. The latter manner has the advantage that the process of mixing the coarse aggregate can be omitted.

Next, in the present invention, the remaining cement, i.e., 80 to 0% of the total cement amount and the sand are mixed with the paste. In this case, they may be mixed in the order of the cement and then the sand, or at one time.

The function of the present invention will be described in accordance with the stream of fundamental manufacturing processes.

Process (1) In the first place, to about 20 to 100% of the total amount of the used cement, water was added in an amount of about 20 to 50% of this cement weight. Afterward or simultaneously, the total amount of the coarse aggregate is added thereto and mixed therewith. At this time, the chemical admixture may be added thereto in an amount of 0 to 60% of its total weight.

Process (2) To the mixture prepared in the process (1), 80 to 0% of the total amount of the used cement and the total amount of the sand are added in the order of the cement and the sand or simultaneously, and they are then mixed. At this time, the total amount of the admixture material may be added thereto.

Process (3) The remaining water and chemical admixture are added thereto and mixed.

In the respective steps just described, uniform mixing is necessary. In each step mentioned above, an admixture material (the volume of which is counted in that of the concrete) may be added. The addition of the admixture material permits the improvement in the fluidity of the concrete, the control of hydration heat of the concrete, the development in strength by the admixture material itself, and the like.

Examples of the usable admixture materials include fly ash and fumed silica.

The strength of the concrete depends on a ratio of water to cement, i.e., a water/cement ratio (W/C). This indicates that when the unit water amount (W) is increased with the intention of heightening the fluidity, the cement amount (C) must also be increased, if the similar strength is required. Therefore, from an economic viewpoint, it is preferred that the cement amount (the unit water amount) is reduced as much as possible in order to obtain the similar strength, but in such a case, the fluidity is naturally deteriorated. For the purpose of improving this fluidity, it is necessary to add a chemical admixture such as the water reducing agent or the like.

On the other hand, if the water-cement ratio (W/C) is heightened, the unit water amount will be large and a predetermined fluidity can be obtained without especially using any chemical admixture. In other words, the concrete having the low strength can be sufficiently manufactured without using any chemical admixture.

In addition, such an admixture material as the above mentioned fly ash may be employed, when needed.

(1) In the process (1) mentioned above, a membrane of the cement paste is formed on the surface of each grain of the coarse aggregate.

(2) Moreover, in the process (2) above, the extra water in the process (1) is absorbed by the newly added cement, so that the hard membrane of the cement paste is formed on each surface of the coarse aggregate grains. In addition, the membranes of the cement paste are further strengthened by the sand added in this process (2).

(3) Thus, although the remaining water is added in the process (3), the formed cement paste membranes are not broken with ease.

(4) As for the lightweight aggregate, in the process (1), the membranes of the cement paste through which water is difficult to permeate are formed all over the surfaces of the grains of the lightweight aggregate. Further, in the process (2), 80 to 0% of the total cement amount is mixed, thereby enhancing the strength of the membranes (since the extra water is absorbed by the cement and since the concrete is thereby consolidated). In short, the absorption of water by the lightweight aggregate is prevented by the membranes of the cement paste which have been formed on the surfaces of the lightweight aggregate grains, whereby the deterioration in the quality of the concrete is inhibited.

The fluidity (the degree of a slump) of the concrete varies with a blend proportion of the materials, but when attention is paid to the cement and water in a certain formulation, the greater the amount of water is, the better the fluidity is naturally (if the amount of water is constant, the smaller the amount of the cement is, the better the fluidity is).

When mixing is carried out in accordance with the present invention, the cement content of the cement paste membranes formed on the surfaces of the coarse aggregate grains seems to be reduced from the total amount of the cement (an amount of the cement to a certain water amount is decreased in fact). In consequence, the present invention permits improving the fluidity, even if the same formulation (the same amounts of the cement and water) as in a conventional case is employed.

Further, in the concrete according to the method of the present invention, a bonding force between the coarse aggregate grains and the mortar material is strengthened by the membranes of the cement paste which are formed on the surfaces of the aggregate grains, so that the freeze-thaw resistance, i.e., the durability is enhanced, and the strength also becomes equal to or higher than that of the conventional concrete.

Furthermore, the concrete according to the present invention can contain less cement than in the conventional method, which fact is economically advantageous.

In the case of the lightweight concrete, the cement paste membranes formed on the surfaces of the lightweight aggregate grains having the great water absorption can prevent the lightweight aggregate from additionally absorbing water, even when the remaining water and the sand are added and mixed. Therefore, the present invention enables the lightweight aggregate to be delivered under pressure by a pump, though such a delivery has been considered to be difficult because of the great water absorption of the aggregate. It has been heretofore believed that the lightweight aggregate is weak in a freeze-thaw cyclic situation because of its great water absorption, but the present invention also permits improving this point.

EXAMPLE 1

A cement, water and a sand were kneaded in accordance with the formulation set forth in Table 1 and the procedure of the following processes (a) to (d):

TABLE 1

| (Formulation) | | | |
|---|---|---|---|
| Cement | Water | Sand | (kg/50 l) Coarse Aggregate* |
| 20 | 10 | 41 | 44 |

*Macadam from Hiroshima in Japan (a) Conventional method

Process (1) The total amounts of the cement, water and the sand were mixed with one another.

Process (2) The coarse aggregate was added thereto and mixed.

(b) Method 1 according to the present invention

Process (1) 10 kg (50% of the total amount) of the cement, 3 kg (30% of 10 kg of the cement) of water and the total amount of the coarse aggregate were mixed with one another.

Process (2) 10 kg of the remaining cement and the total amount of the sand were added and mixed.

Process (3) 7 kg (70% of the total amount) of the remaining water was added and mixed.

(c) Method 2 according to the present invention

Proces (1) The total amount of the cement and 5 kg (25% of the cement) of water were mixed with each other.

Process (2) The coarse aggregate was added and mixed.

Process (3) The total amount of the sand was added and mixed.

Process (4) 5 kg (50% of the total amount) of the remaining water were added and mixed.

(d) Method 3 according to the present invention

Process (1) 5 kg (25% of the total amount) of the cement, 2.5 kg (50% of 5 kg of the cement) of water and the total amount of the coarse aggregate were mixed with one another.

Process (2) 15 kg of the remaining cement and the total amount of the sand were added and mixed.

Process (3) 7.5 kg (75% of the total amount) of the remaining water was added and mixed.

For the respective concretes manufactured by mixing the materials in accordance with the various methods, their slumps and strengths were measured in accordance with a slump test (JIB A 1101) and a compression test (JIB A 1108), respectively. The results are set forth in Table 2.

TABLE 2

| | (Results) | | |
|---|---|---|---|
| | Slump (cm) | Compressive Strength (kg/cm$^2$) | |
| | | 7th day | 28th day |
| (a) Conventional Method | 6.0 | 338 | 408 |
| (b) Method 1 of Present Inv. | 9.5 | 349 | 442 |
| (c) Method 2 of Present Inv. | 6.5 | 340 | 422 |
| (d) Method 3 of Present Inv. | 9.2 | 345 | 438 |

EXAMPLE 2

Materials were kneaded in accordance with the formulation set forth in Table 3 and the procedure of the following processes (a) to (d):

TABLE 3

| (Formulation) | | | | |
|---|---|---|---|---|
| Cement | Water | Sand | Coarse Aggregate* | (kg/50 l) Chem. Admixture** |
| 22.5 | 8.55 | 41 | 45 | 0.225 |

*Same as in Example 1
**Mighty 150 (trade name; Kao Soap Co., Ltd.; high-performance water reducing agent)

(a) Conventional method
Process (1) The total amounts of the cement, water and the sand were mixed with one another.
Process (2) The coarse aggregate was added thereto and mixed.

(b) Method 1 according to the present invention
Process (1) 5 kg (22% of the total amount) of the cement, 2.5 kg (50% of 5 kg of the cement) of water and 0.1 kg (about 50% of the total amount) of the chemical admixture were mixed with one another.
Process (2) The coarse aggregate was added and mixed.
Process (3) 1.75 kg of the remaining cement and the total amount of the sand were added and mixed.
Process (4) 6.05 kg (about 71% of the total amount) of the remaining water and 0.125 kg of the chemical admixture were added and mixed (c) Method 2 according to the present invention
Process (1) The total amount of the cement and 5 kg (22% of the total amount of the cement) of water were mixed with each other.
Process (2) The coarse aggregate was added and mixed.
Process (3) The total amount of the sand was added and mixed.
Process (4) 3.55 kg (about 42% of the total amount) of the remaining water and the total amount of the chemical admixture were added and mixed.

(d) Method 3 according to the present invention
Process (1) 11 kg (about 50% of the total amount) of the cement, 3 kg (about 27% of 11 kg of the cement) of water and 0.1 kg (about 50% of the total amount) of the chemical admixture and the coarse aggregate were mixed with one another.
Process (2) 11.5 kg of the remaining cement and the total amount of the sand were added and mixed.
Process (3) 5.55 kg (about 65% of the total amount) of the remaining water and 0.125 kg of the chemical admixture were added and mixed.

For the respective concretes manufactured by mixing the materials in accordance with the various methods, tests were carried out in the same manner as in Example 1. The results are set forth in Table 4.

TABLE 4

| | (Results) | | |
|---|---|---|---|
| | Slump (cm) | Compressive Strength (kg/cm$^2$) | |
| | | 7th day | 28th day |
| (a) Conventional Method | 7.5 | 465 | 522 |
| (b) Method 1 of Present Inv. | 18.5 | 477 | 542 |
| (c) Method 2 of Present Inv. | 19.1 | 468 | 529 |
| (d) Method 3 of Present Inv. | 18.7 | 478 | 546 |

EXAMPLE 3

Materials were kneaded in accordance with the formulation set forth in Table 5 and the procedure of the following processes A and B:

TABLE 5

| (Formulation) | | | | | | |
|---|---|---|---|---|---|---|
| Case | Cement | Water | Sand | Coarse Aggregate* | Admixture Material*** | (kg/30 l) Chem. admixture** |
| A-1 | 15 | 4.95 | 17.7 | 32.2 | 1.68 | 0.15 |
| A-2 | 13.5 | 5.13 | 19.7 | 31.0 | 1.50 | 0.135 |

*Same as in Example 1
**Same as in Example 2
***Fly ash (Johban Fly Ash)

A. Conventional method
Process (1) The total amounts of the cement, water, the sand, the admixture material and the chemical admixture were mixed with one another.
Process (2) The coarse aggregate was added thereto and mixed.

B. Method according to the present invention
(1) Case A-1
Process (1) 7.5 kg (50% of the total amount) of the cement, 2.25 kg (30% of 7.5 kg of the cement) of water and 0.075 kg (about 50% of the total amount) of chemical admixture were mixed with one another.
Process (2) The coarse aggregate was added and mixed.
Process (3) 7.5 kg of the remaining cement was added and mixed.
Process (4) The total amounts of the sand and the admixture material were added and mixed.
Process (5) 2.7 kg (about 55% of the total amount) of the remaining water and 0.075 kg of the chemical admixture were added and mixed.

(2) Case A-2
Process (1) 6 kg (about 44% of the total amount) of the cement, 1.5 kg (25% of 6 kg of the cement) of water and 0.06 kg (about 44% of the total amount) of the chemical admixture were mixed with one another.
Process (2) The total amount of the coarse aggregate was added and mixed.
Process (3) 7.5 kg of the remaining cement was added and mixed.
Process (4) The total amounts of the sand and the admixture material were added and mixed.
Process (5) 2.88 kg (about 56% of the total amount) of the remaining water and 0.075 kg of the chemical admixture were added and mixed.

For the respective concretes manufactured by mixing in accordance with the various methods, tests were carried out in the same manner as in Example 1. The results are set forth in Table 6.

TABLE 6

(Results)

| Case | Manufacturing Method | Slump (cm) | Compressive Strength (kg/cm$^2$) | |
|---|---|---|---|---|
| | | | 7th day | 28th day |
| A-1 | Conventional Method | 4.0 | 526.1 | 567.7 |
| | Method of Present Inv. | 11.2 | 537.6 | 582.4 |
| A-2 | Conventional Method | 7.7 | 468.8 | 523.5 |
| | Method of Present Inv. | 18.8 | 476.9 | 539.3 |

EXAMPLE 4

Materials were kneaded in ccordance with the formulation set froth in Table 7 and the procedure of the following process (a) to (g):

TABLE 7

(Formulation)

| | | | (kg/50 l) |
|---|---|---|---|
| Cement | Water | Sand | Lightweight Aggregate |
| 15 | 9.75 | 43 | 22 |

Note: All the lightweight aggregate was in an absolute dry state.

(a) Conventional method

Process (1) The total amounts of the cement, water and the sand were mixed with one another.

Process (2) The lightweight aggregate was added thereto and mixed.

(b) Method 1 according to the present invention

Process (1) 7.5 kg (50% of the total amount) of the cement and 1.9 kg (25% of 7.5 kg of the cement) of water were added and mixed.

Process (2) The total amount of the lightweight aggregate was added and mixed.

Process (3) 7.5 kg of the remaining cement and the total amount of the sand were added and mixed.

Process (4) 7.85 kg (about 81% of the total amount) of the remaining water was added and mixed.

(c) Method 2 according to the present invention

Process (1) The total amount of the cement and 3.75 kg (25% of the total amount of the cement) of water were mixed with each other.

Process (2) The lightweight aggregate was added and mixed.

Process (3) The total amount of the sand was added and mixed.

Process (4) 6 kg (about 62% of the total amount) of the remaining water was added and mixed.

(d) Method 3 according to the present invention

Process (1) 4 kg (27% of the total amount) of the cement and 2 kg (50% of 4 kg of the cement) of water were mixed with each other.

Process (2) The lightweight aggregate was added and mixed.

Process (3) 11 kg of the remaining cement and the total amount of the sand were added and mixed.

Process (4) 7.5 kg (about 79% of the total amount) of the remaining water was added and mixed.

(e) Method 4 according to the present invention

Process (1) 7.5 kg (50% of the total amount) of the cement, 1.9 kg (25% of 7.5 kg of the cement) of water and the total amount of the lightweight aggregate were mixed with one another.

Process (2) 7.5 kg of the remaining cement and the total amount of the sand were added and mixed.

Process (3) 7.85 kg (about 82% of the total amount) of the remaining water was added and mixed.

(f) Method 5 according to the present invention

Process (1) The total amount of the cement, 3.75 kg (25% of the total amount of the cement) of water and the lightweight aggregate were mixed with one another.

Process (2) The total amount of the sand was added and mixed.

Process (3) 6 kg (about 62% of the total amount) of the remaining water was added and mixed.

(g) Method 6 according to the present invention

Process (1) 4 kg (about 27% of the total amount) of the cement, 2 kg (50% of 4 kg of the cement) of water and the total amount of the lightweight aggregate were mixed with one another.

Process (2) 11 kg of the remaining cement and the total amount of the sane were added and mixed.

Process (3) 7.75 kg (about 79% of the total amount) of the remaining water was added and mixed.

For the respective concretes manufactured by mixing the materials in accordance with the various methods, tests were carried out the same manner as in Example 1. The results are set forth in Table 8.

TABLE 8

(Results)

| | Slump (cm) | Compressive Strength (kg/cm$^2$) 28th day |
|---|---|---|
| (a) Conventional Method | 4.4 | 210 |
| (b) Method 1 of Present Inv. | 6.8 | 232 |
| (c) Method 2 of Present Inv. | 5.0 | 223 |
| (d) Method 3 of Present Inv. | 7.0 | 234 |
| (e) Method 4 of Present Inv. | 6.5 | 235 |
| (f) Method 5 of Present Inv. | 4.9 | 225 |
| (g) Method 6 of Present Inv. | 6.5 | 229 |

EXAMPLE 5

Materials were kneaded in accordance with the formulation set forth in Table 9 nd the procedure of the following processes (a) to (g):

TABLE 9

(Formulation)

| | | | | | (kg/50 l) |
|---|---|---|---|---|---|
| Cement | Water | Sand | Lightweight Aggregate | Chem. admixture* | Admixture Material** |
| 21 | 84 | 31 | 26 | 0.21 | 21 |

Note: All the lightweight aggregate was in an absolute dry state.
*Same as in Example 2
**Same as in Example 3

(a) Conventional method

Process (1) The total amounts of the cement, water, the sand, the admixture material and the chemical admixture were mixed with one another.

Process (2) The lightweight aggregate was added thereto and mixed.

(b) Method 1 according to the present invention

Process (1) The total amount of the cement, 5 kg (about 24% of the total amount of the cement) of water and 0.1 kg (about 50% of the total amount) of the chemical admixture were added and mixed.

Process (2) The lightweight aggregate was added and mixed.

Process (3) The sand and the total amount of the admixture material were added and mixed.

Process (4) 3.4 kg (about 40% of the total amount) of the remaining water and 0.11 kg of the chemical admixture were added and mixed.

(c) Method 2 according to the present invention

Process (1) 5 kg (about 24% of the total amount) of the cement, 2.5 kg (25% of 5 kg of the cement) of water and 0.05 kg (about 25% of the total amount) of the chemical admixture were mixed with each other.

Process (2) The lightweight aggregate was added and mixed.

Process (3) 16 kg of the remaining cement, and the total amounts of the sand and the admixture material were added and mixed.

Process (4) 5.9 kg (about 70% of the total amount) of the remaining water were and 0.16 kg of the chemical admixture added and mixed.

(d) Method 3 according to the present invention

Process (1) 10 kg (about 50% of the total amount) of the cement and 5 kg (50% of 10 kg of the cement) of water were mixed with each other.

Process (2) The lightweight aggregate was added and mixed.

Process (3) 11 kg of the remaining cement and the total amounts of the sand and the admixture material were added and mixed.

Process (4) 3.4 kg (about 40% of the total amount) of the remaining water and the total amount of the chemical admixture were added and mixed.

(e) Method 4 according to the present invention

Process (1) The total amount of the cement, 5 kg (about 24% of the total amount of the cement) of water, 0.1 kg (about 50% of the total amount) of the chemical admixture and the lightweight aggregate were mixed with one another.

Process (2) The total amounts of the sand and the admixture material were added and mixed.

Process (3) 3.4 kg (about 40% of the total amount) of the remaining water and 0.11 kg of the chemical admixture were added and mixed.

(f) Method 5 according to the present invention

Process (1) 5 kg (about 24% of the total amount) of the cement, 2.5 kg (25% of 5 kg of the cement) of water, 0.05 kg (about 25% of the total amount) of the chemical admixture and the lightweight aggregate were mixed with one another.

Process (2) 16 kg of the remaining cement, and the total amounts of the sand and the admixture material were added and mixed.

Process (3) 5.9 kg (about 70% of the total amount) of the remaining water and 0.16 kg of the chemical admixture were added and mixed.

(g) Method 6 according to the present invention

Process (1) 10 kg (about 50% of the total amount) of the cement, 5 kg (50% of 10 kg of the cement) of water and the lightweight aggregate were mixed with one another.

Process (2) 11 kg of the remaining cement and the total amounts of the sand and the admixture material were added and mixed.

Process (3) 3.4 kg (about 40% of the total amount) of the remaining water and the total amount of the chemical admixture were added and mixed.

For the respective concretes manufactured by mixing the material in accordance with the various methods, tests were carried out in the same manner as in Example 1. The results are set forth in Table 10.

TABLE 10

| | (Results) | |
|---|---|---|
| | Slump (cm) | Compressive Strength (kg/cm$^2$) 28th day |
| (a) Conventional Method | 7.1 | 484 |
| (b) Method 1 of Present Inv. | 11.5 | 513 |
| (c) Method 2 of Present Inv. | 17.8 | 562 |
| (d) Method 3 of Present Inv. | 22.0 | 507 |
| (e) Method 4 of Present Inv. | 12.0 | 510 |
| (f) Method 5 of Present Inv. | 18.7 | 574 |
| (g) Method 6 of Present Inv. | 21.2 | 505 |

EXAMPLE 6

Materials were kneaded in accordance with the formulation set forth in Table 11 and the procedure of the following processes (a) and (b) in order to prepare test pieces (10 cm × 10 cm × 40 cm) for a freeze-thaw test, and this test was then carried out by the use of these test pieces:

TABLE 11

| | | | (Formulation) | | |
|---|---|---|---|---|---|
| Cement | Water | Sand | Lightweight Aggregate | Chem. admixture* | (kg/50 l) Admixture Material** |
| 26 | 7.8 | 25.3 | 24.5 | 0.39 | 2.6 |

Note: All the lightweight aggregate was in an absolute dry state.
*Same as in Example 2
**Same as in Example 3

(a) Conventional method

Process (1) The total amounts of the cement, water, the sand, the admixture material and the chemical admixture were mixed with one another.

Process (2) The lightweight aggregate was added thereto and mixed.

(b) Method according to the present invention

Process (1) 13 kg (50% of the total amount) of the cement, 3.9 kg (30% of 13 kg of the cement) of water and 0.19 kg (about 50% of the total amount) of the chemical admixture were added and mixed.

Process (2) The lightweight aggregate was added and mixed.

Process (3) 13 kg of the remaining cement, and the total amounts of the sand and the admixture material were added and mixed.

Process (4) 3.9 kg (about 50% of the total amount) of the remaining water and 0.2 kg of the chemical admixture were added and mixed.

For the respective concretes prepared by mixing the materials in the various manners, the freeze-thaw test was carried out. This freeze-thaw test was achieved in accordance with an underwater rapid freeze-thaw test (repetition of a cycle of −17.8° C. to +4.4° C.) of the ASTM C-666A process. That is, a dynamic elastic coefficient was measured every 30 cycles until 300 cycles were reached.

The procedure of the freeze-thaw test has not been legislated in Japan, and therefore, Public Works Society, Building Society and the like apply the above mentioned ASTM process.

The results of the measurement are set forth in FIG. 1. In this drawing, the abscissa axis represents the repetition number of the freeze-thaw cycle, and the ordinate axis represents the relative dynamic modulus of elasticity. This relative dynamic modulus of elasticity is represented by the following formula:

Relative dynamic modulus of elasticity $= En/Eo \times 100(\%)$ where Eo is a dynamic modulus of elasticity immediately before the beginning of the test, and En is a dynamic modulus of elasticity at each cycle number.

In consequence, if a value of this relative dynamic modulus of elasticity is close to a level of 100%, the concrete having such a value can be judged to be less deteriorated by the repetition of the freeze-thaw cycle. In other words, it can be considered to be excellent in durability.

The results in FIG. 1 indicate that, in the concrete of the present invention, the relative dynamic modulus of elasticity could be maintained at a level of 90% or more even at 300 cycles, though in the case of the concrete made by the conventional method, the coefficient fell below a level of 60% in the vicinity of about 240 cycles. This fact means that the concrete of the present invention has very excellent freeze-thaw resistance. In the above mentioned ASTM process, the test is to be continued until the relative dynamic modulus of elasticity has fallen below 60% or the 300 freeze-thaw cycles have been reached. Usually, the successful freeze-thaw resistance lies at a level of 60% or more of the relative dynamic modulus of elasticity (at 300 cycles).

What is claimed is:

1. A method for manufacturing a concrete which comprises the steps of:
   mixing 20 to 100% of the total weight of the cement to be used in the method with water in an amount of 20 to 50%, based on the total weight of the cement to be used, in order to prepare a stiff-consistency cement paste;
   mixing the thus prepared cement pase with a coarse aggregate to cause the prepared cement paste to adhere to the coarse aggregate;
   further adding 80 to 0% of the total amount of the cement to be used together with sand; and
   mixing therewith additional water in an amount necessary to harden the total cement composition to manufacture said concrete.

2. A method for manufacturing a concrete which comprises the steps of mixing 20 to 100% of the total weight of the cement to be used in the method with water in an amount of 20 to 50%, based on the total weight of the cement to be used, and a coarse aggregate, so that a stiff-consistency cement paste is prepared and caused to adhere to the coarse aggregate;
   further adding 80 to 0% the total amount of the cement to be used together with sand; and
   mixing therewith additional water in an amount necessary to harden the total cement composition to manufacture said concrete.

3. The method for manufacturing a concrete according to claim 1 wherein in preparing said stiff-consistency cement paste, 0 to 60% of the total amount of a chemical admixture to be added is mixed therewith, and in mixing the additional water necessary to harden the total cement, the remaining chemical admixture is mixed therewith.

4. The method for manufacturing a concrete according to claim 1 wherein the further adding of the 80 to 0% of the cement and the sand are conducted simultaneously.

5. The method for manufacturing a concrete according to claim 1 wherein said coarse aggregate is a lightweight aggregate.

6. The method for manufacturing a concrete according to claim 2 wherein in preparing said stiff-consistency cement paste, 0 to 60% of the total amount of a chemical admixture to be added is mixed therewith, and in mixing the remaining water necessary to harden the total cement, the remaining chemical admixture is mixed therewith.

7. The method for manufacturing a concrete according to claim 2 wherein the further adding of the 80 to 0% of the cement and the sand are conducted simultaneously.

8. The method for manufacturing a concrete according to claim 3 wherein the further adding of the 80 to 0% of the cement and the sand are conducted simultaneously.

9. The method for manufacturing a concrete according to claim 2 wherein said coarse aggregate is a lightweight aggregate.

10. The method for manufacturing a concrete according to claim 6 wherein the further adding of the 80 to 0% of the cement and the sand are conducted simultaneously.

11. The method for manufacturing a concrete according to claim 1 wherein the further adding of the cement and the sand are conducted sequentially.

12. The method for manufacturing a concrete according to claim 2 wherein the further adding of the cement and the sand are conducted sequentially.

* * * * *